United States Patent [19]

Elton

[11] Patent Number: 4,592,056
[45] Date of Patent: May 27, 1986

[54] RESONANT PHOTON PUMPING MECHANISMS FOR A PLASMA X-RAY LASER

[75] Inventor: Raymond C. Elton, Potomac, Md.

[73] Assignee: The United States of America as represented by the Secretary of the Navy, Washington, D.C.

[21] Appl. No.: 569,686

[22] Filed: Jan. 10, 1984

[51] Int. Cl.$^4$ .............................................. H01S 3/30
[52] U.S. Cl. ......................................... 372/5; 372/69; 372/68
[58] Field of Search ............................ 372/3, 5, 69, 70

[56] References Cited

U.S. PATENT DOCUMENTS 4,201,955 5/1980 Elton et al. .
4,206,364 6/1980 Dixon et al. .
4,218,628 8/1980 Harris .

Primary Examiner—Léon Scott, Jr.
Attorney, Agent, or Firm—Robert F. Beers; Sol Sheinbein; William T. Ellis

[57] ABSTRACT

A lasing system for lasing at x-ray wavelengths. In one embodiment, a neon-like sulfur ion $S^{6+}$ plasma is caused to radiate on its 3d→2p transition to pump a lithium-like neon $Ne^{7+}$ plasma to obtain x-ray lasing. In a second embodiment, a lithium-like silicon $Si^{11+}$ ion plasma is caused to radiate on the 3d→2p transition to pump lithium-like magnesium $Mg^{9+}$ plasma to obtain x-ray lasing.

11 Claims, 4 Drawing Figures

RESONANT PHOTON PUMPING MECHANISMS FOR A PLASMA X-RAY LASER

BACKGROUND OF THE INVENTION

The present invention relates generally to lasers and laser pumping systems, and more particularly to mechanisms for photon pumping a population inversion on selective energy levels in highly stripped plasma ions in order to obtain lasing at x-ray wavelengths.

There is strong interest in achieving laser action in the x-ray range ($1 Å < \lambda < 700 Å$) and many novel schemes have been proposed. The potential applications for a coherent source in the x-ray wavelength regime include bio-medical research and holography wherein the x-ray laser radiation would be utilized to "photograph" objects with dimensions below 1,000 Angstroms. Such an x-ray laser would also be useful in the study of high density plasmas for laser fusion. Remote sensing of various elements using x-ray induced fluorescence or diffraction is another potential application.

The achievement of significant gain in the spectral region located at wavelengths shorter than 1000 Angstroms, where reflecting cavities become very inefficient, requires very high inverson population densities in the upper energy state that is to lase as well as high pump power densities. Additionally, it is required to create population inversions on high energy transitions in order to obtain gain at short x-ray wavelengths. The pump power density required in order to obtain this population inversion generates highly-stripped ions in a high temperature plasma state of matter. A highly stripped ion is an ion with many electrons removed, typically through collisions with other particles via heating at temperatures on the order of one million degrees Kelvin (100 eV). In the prior art, pumping has been attempted via electron and ion collisions as well as by photoionization. By way of example, Pat. No. 4,229,708 to Mani et al. discloses an x-ray laser wherein a metastable state is pumped via photoionization.

A highly efficient method of pumping to obtain coherent x-ray radiation uses an intense spectral line from one plasma ion to pump on an absorption transition in another plasma ion, with nearly the same nuclear charge, and as nearly an exact wavelength match between the two transitions as possible. Note that the ions in the two different plasmas should have approximately the same nuclear charge in order to ensure that they will coexist together in close proximity at the same temperature. The particular degree of ionization ion present (the number of electrons stripped from the particular atom) will depend very strongly on the temperature at that particular location. Thus, it is essential that the desired pumping ion and lasing ion coexist at a particular temperature.

Wavelength coincidences within the natural or Doppler linewidths are rare. (Note that Doppler linewidths, i.e., the spectral broadening due to the movement of ions in the plasma causing changes in the frequency of the radiation detected, are usually on the order of a few tens of milli-Angstroms.) Two promising possibilities for such wavelength coincidences involve hydrogenic potassium pumping hydrogenic chlorine, and helium-like sodium pumping helium-like neon. These ions in the $Z = 10-20$ range with only one or two electrons remaining require very high temperatures usually created only in a point or short line focus of a high power state-of-the-art pump laser. The high power lasers required for this type of pumping are expensive.

It can be seen that there is an urgent need for alternate combinations of pump and laser ions that function at lower temperatures, and can be routinely studied with moderate-power laboratory lasers. Such alternate combinations should be adaptable to extension to centimeters of length in line focus via cylindrical and spherical lens combinations in order to permit high gain experiments on large pump faciities.

OBJECTS OF THE INVENTION

Accordingly, it is an object of the present invention to provide combinations of pump and laser ions which will function at lower plasma temperatures.

It is a further object of the present invention to generate lasing at short x-ray wavelengths using highly-stripped ions in relatively low temperatures plasmas.

SUMMARY OF THE INVENTION

Briefly, the above and other objects are achieved in one embodiment by means of a lasing producing system which includes apparatus for generating a pumping plasma of neon-like sulfur ions $S^{6+}$ which radiate on the $3d \rightarrow 2p$ transition, and further includes apparatus for generating a plasma of lithium-like neon ions $Ne^{7+}$ which absorb on the $2s \rightarrow 5p$ transition, where the neon ion plasma is generated in close proximity to the sulfur ion plasma in order to obtain pumping radiation from the sulfur ion plasma and to provide quasi-cw lasing at X-ray wavelengths.

In one implementation of this embodiment, a laser may be disposed to focus a beam on a portion of solid sulfur with neon either frozen on the surface thereof, frozen nearby, or disposed thereover in the form of a high pressure gas.

In a second embodiment of the present invention, apparatus may be provided for generating a plasma of lithium-like silicon ions $Si^{11+}$ which radiate on the $3d \rightarrow 2p$ transition, and apparatus for generating a plasma of lithium-like magnesium ions $Mg^{9+}$ which absorb on a $2s \rightarrow 4p$ transition, wherein the magnesium ion plasma is generated in very close proximity to the silicon ion plasma in order to obtain pumping radiation therefrom and to provide quasi-cw lasing at x-ray wavelengths from the $Mg^{9+}$ ions.

Note that both of the described embodiments permit x-ray lasing at lower plasma temperatures than the prior art and therefore can be made to operate at the focus of a modest laboratory laser.

DETAILED DESCRIPTION OF THE PREFERRED EMBODIMENT

Figure 1:
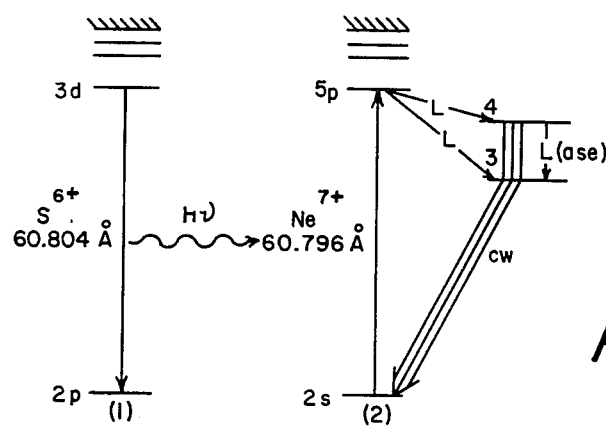
FIG. 1 is an energy level diagram for the pumping-lasing plasma system of a first embodiment of the present invention.

As noted above, in order to pump an x-ray transition directly, large photon energies are required. A standard laser beam, for example from an $Nd^{+3}$ laser, does not provide sufficient photon energies to pump such x-ray transitions. In the present invention, such a laser beam pulse is used instead to vaporize and heat a pump material to generate plasma x-rays, which in turn, fall onto a nearby lasing material and pump the upper energy levels of that lasing material to inverted populations.

In essence, the present invention is a lasing system which utilizes matched-line photo excitation pumping. In this mode of pumping, specific ionic excited states are efficiently pumped to over-population relative to a lower state by narrow band near-resonance absorption of fine radiation. Note that while it is possible to consider pumping by the same ion and transition as is used for the absorber/lasant ion, usually this emission is insufficient for lasing purposes. Hence, ions of different species are generally required.

When a population inversion is created, stimulated emission competes with flourescent emission. Optimum pumping is obtained with the emission and absorption transitions at precisely the same energy and bandwidth (i.e., wavelength and linewidth).

Accordingly, it can be seen that matches must be found between the emission and absorption transitions of the various ionic species. Moreover, certain additional criteria must be invoked for the pumping-laser system candidates. Besides the overlap of ion transition widths, strong transitions are required for the pump ion in order to assure emission saturation, and a strong absorber ion transition is required for efficient pumping in order to ensure high gain for a given laser line. Rapid lower-laser-state population depletion is also desirable for quasi-cw operation. Moreover, the achievement of lasing between low-lying energy levels of the lasant may avoid photoionization by the laser beam. In addition to these "atomic considerations", it is also desirable to have pumping and lasing plasmas of comparable charge and temperatures to maintain a large solid angle of photo coupling and congruent ionic species.

It has been discovered that a neon-like (stripped to 10 electrons like neon) sulfur ion designated $S^{+6}$ radiates on a 3d→2p transition at 60.804 Angstroms and can be used to pump a lithium-like (stripped to 3 electrons like lithium) neon ion designated $Ne^{+7}$ on a 2s→5p absorption transition at 60.796 Angstroms, with a wavelength difference of only 8 milli Angstroms. Note that the 3d→2p transition is a closed shell pumping transition. This $S^{+6}$—$Ne^{+7}$ lasing combination meets all of the above requirements. Note in particular that the wavelength difference between the sulfur ion emission and the neon ion absorption of 8 milli-Angstroms is comparable to the milli-Angstrom Doppler linewidth in a T = 100 eV plasma in which these ions could be created. In this regard, the $S^{+6}$ ionizes at 281 eV and the $Ne^{+7}$ ionizes at 239 eV energies.

The 3d→2p pumping transition for the sulfur ion and the 2s→5p absorption transition of the neon ion are shown in FIG. 1. It can be seen that quasi-cw amplification takes place on the 5→4, 4→3 and the 5→3 transitions in the $Ne^{+7}$ at 564, 221 and 183 Angstroms, respectively. Note that all three of these lasing transitions have a rapid lower laser state depletion to prevent bottlenecking.

Both the pumping and lasant plasmas may be created at the focus of a single high power laser, or by using two high power lasers focusing on points in close adjacency. The sulfur may be conveniently in slab form and the neon may be either frozen onto the surface of the sulphur slab or onto a material adjacent to the sulfur, or generated in a gas adjacent to a surface of the sulfur slab. There are a variety of high power lasers which may be utilized to implement the present invention. By way of example, and not by way of limitation, an Nd: glass "visible" laser may be utilized. In the experiments performed with this combination of pump and lasant material, a 10600 Angstroms Nd-glass driving laser was operated at 20J, 10 ns, and focused to a 0.5 mm diameter spot on a sulphur slab target. This results in approximately $10^{12}$ watts/cm$^2$ of power applied to the sulfur slab target.

An apparatus for cryogenically fabricating a sulfur slab with neon frozen on a portion of the surface is disclosed in U.S. Pat. application Ser. No. 500,725, filed June, 3, 1983, by R. C. Elton, R. H. Dixon, and J. L. Ford. This patent application is hereby incorporated by reference into the present disclosure.

Figure 3:
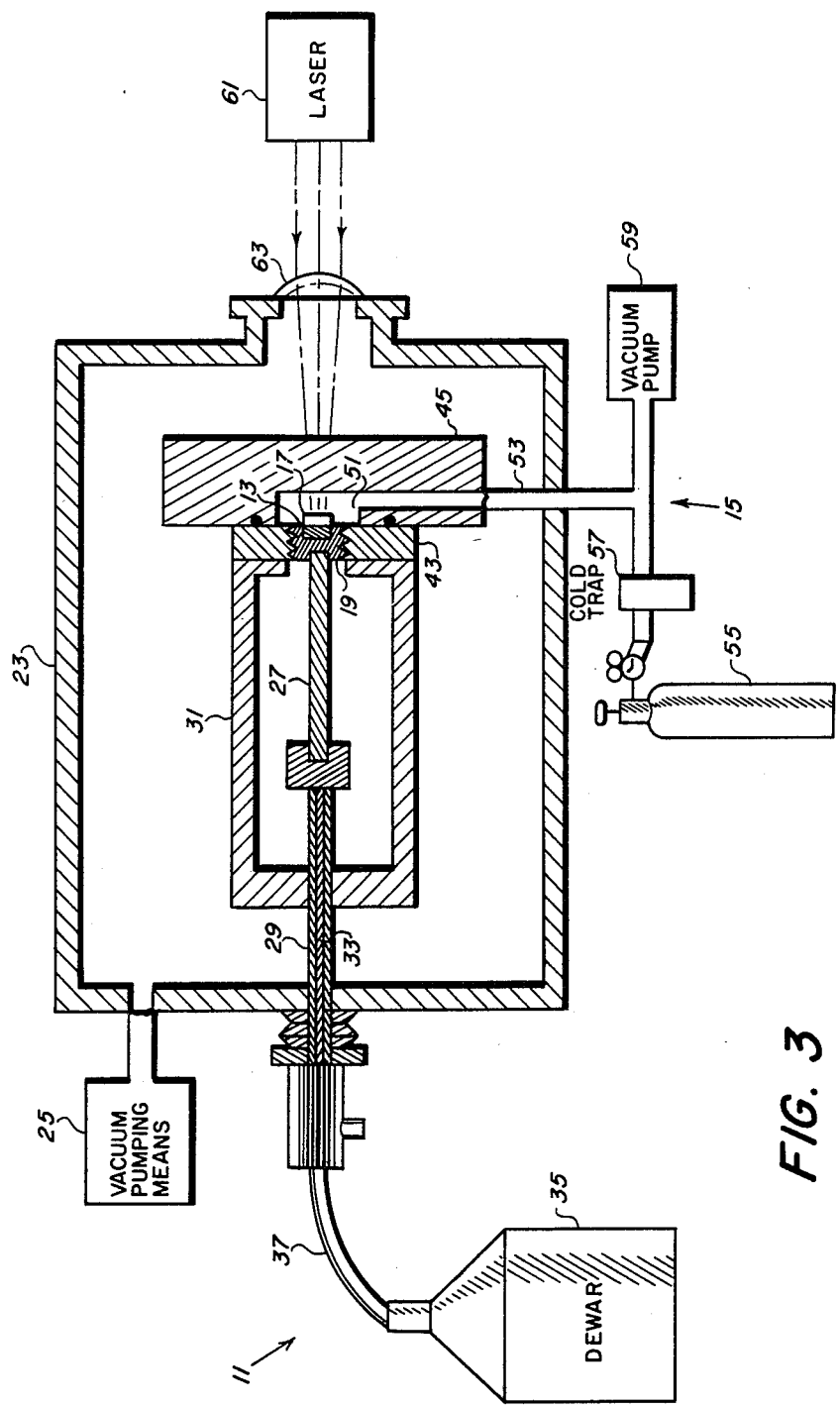
FIG. 3 is a schematic diagram of an apparatus which may be utilized to pump lithium-like neon ions with neon-like sulphur ions.

FIG. 3 of the present disclosure sets forth the apparatus disclosed in that '757 patent application for freezing the neon onto the surface of the sulfur. This apparatus includes a cooling circuit 11 which is employed to cool a sulfur substrate 13 in order to hold the normally-solid sulfur material below the freezing point of neon gas. The apparatus also includes a supply means 15 employed to supply the gaseous atmosphere of neon to the cooled sulfur substrate 13 so that a frozen layer 17 condenses onto the substrate to form the target.

In the example apparatus shown in FIG. 3, the cooling means 11 takes the form of a thermally-conducting block 19 having a top face that includes a recess for mounting the substrate 13 of the sulphur material, and a cryostat comprising a housing 23 surrounding the block 19, a vacuum pumping means 25 communicating with the housing 23, a thermally conducting rod 27 disposed inside the housing and connected to the bottom face of the block 19, a cold finger 29 passing through the housing by way of a vacuum seal and connected to the rod 27, and a radiation shield 31 connected to the cold-finger and surrounding the rod 27 and part of the cold-finger 29. The cold-finger 29 has a central channel 33 adapted to receive a coolant such as liquid helium from a dewar 35 disposed outside the housing 23 via a transfer line 37.

The supply means 15 is shown in FIG. 3 to include a thermally insulating jacket 43 of lucite sealingly enclosing the side wall of the block 19 and fitted against the radiation shield 31. A removable thermally-insulating cap 45 sealingly engages the top face of the jacket 43. The cap 45 has a hole 51 adapted to coincide with the mounted substrate 13 and to communicate by way of a bifurcated tube 53 with an external pressurized source 55 of gaseous neon preceded by a cold trap 57 of liquid nitrogen and a vacuum pump 59.

In operation, the sulfur substrate 13 is mounted in the recess in the top face of the block 19 and then the cap 45 is sealingly engaged to the jacket 43. The block 19 is then cooled and maintained of 8° Kelvin absolute for neon by evacuating the housing 23 with the vacuum pump 25 and transmitting liquid helium from the dewar 35 by way of the transfer line 37 and connector 39 through the channel 33. Next, the neon gas is supplied to the mounted substrate 13 through the hole 51 in the cap 45 from the pressurized source 55 and the cold trap 57 that pre-cools the gas. The pressure of the gas may be 1.5 atmospheres for neon. A pool of neon gas liquifies on the substrate 13 and then forms a frozen layer on the substrate. The remaining gas is then pumped from the hole 51. In order to expose the sulfur target, the cap 45 is removed. An external Nd glass laser may then be focused on the target by means of a lens 63 disposed in the wall of the housing 23 opposite the target.

It should be noted that for maximum gain, a lasant plasma with cool ions should be essentially congruent with the hot dense pumping plasma. This may be accomplished by maintaining a portion of the surface of the sulfur substrate 13 free of the frozen neon, possibly by covering it with a portion of the cap 45. Then a second laser may be focused on this uncoated portion of the sulfur substrate adjacent to the neon-coated portion. These two lasers (only one laser is shown in FIG. 3) would both be focused through lens 63 and would be slightly offset. This two laser configuration allows the neon to expand a little further away from the sulfur material that it is pumping. The separation between the uncoated portion of the substrate 13 and the neon coated portion may on the order of 100 $\mu$m. A first laser pulse would be applied to the bare sulfur portion of the substrate, and then a second laser pulse would be applied to the neon coated portion of the substrate 13 approximately 1 nanosecond later. It should be noted, that this separation of the pumping and lasant plasmas is not essential, but is considered to optimize the resulting gain.

In another implementation, a neon gas could simply be disposed adjacent to a surface of a sulfur slab target. Only approximately one-tenth of an atmosphere of neon gas would be required. When a laser is focused on the sulfur slab target, the electrons in the sulfur ion plasma generated act to break down or ionize the surrounding neon gas thereby permitting lasing.

It should be noted that the present sulfur-neon ion lasing system requires a lower plasma temperature because the ions are not one or two electron ions which required higher temperatures to generate, but rather lithium-like and neon-like ions containing three electrons and ten electrons, respectively. This design feature permits a much smaller laser to be used.

Figure 2:
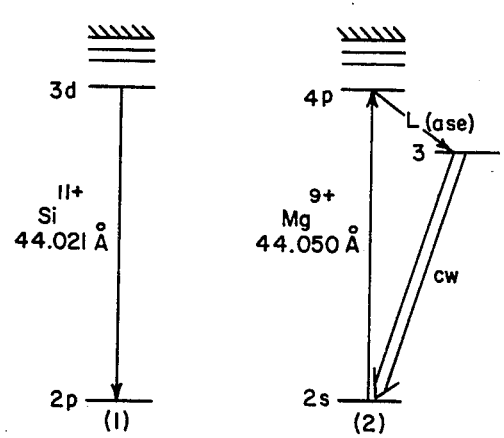
FIG. 2 is an energy level diagram for the pumping-lasing plasma system of a second embodiment of the present invention.

In a second embodiment of the present invention, lithium-like silicon $Si^{+11}$ with a transition of 3d→2p is used to pump lithium-like magnesium $Mg^{+9}$ which absorbs on the 2s→4p transition. The emission wavelength for the lithium-like silicon ion is 44.021 Angstroms and the absorption wavelength for lithium-magnesium ion is 44.050 Angstroms, with a difference therebetween of 30 milli-Angstroms. This silicon ion emission and magnesium ion absorption match is shown in FIG. 2. Note that the ionization potentials for this embodiment are 523 eV for silicon and 367 eV for magnesium. Thus, slightly higher temperatures in the range of 150 eV are required in the plasmas. The lasing occurs on the 4→3 transition for the magnesium ion at 170 Angstroms.

Note that the Doppler linewidths are about 8 milli-Angstroms, which is approximately only $\frac{1}{4}$ of the wavelength difference between the silicon ion pump emission wavelength and the magnesium ion absorber wavelength. Accordingly, additional Stark broadening at higher electron densitites (approximately $10^{21}$ cm$^{-3}$) or Doppler shifting with relative streaming is required. In this disclosure, Stark broadening is defined as the collisional broadening which is obtained when the electric field from one ion causes other ions to change their radiating frequency slightly. In this context, the term Doppler shifting with relative streaming means the Doppler shift obtained when ions are streaming away from other ions. It should be noted that there are a number of techniques to obtain this spectral broadening in order to make up the 30 milli-Angstrom difference between the emission and the absorber wavelengths. By way of example, a thin foil made by evaporating or sputtering silicon onto one or both sides of a magnesium foil may be used as the target for the device. This foil may then be hit from opposite sides with two different lasers. As the foil is hit from oppposite directions by the lasers, the plasmas formed thereby expand back toward those laser beams thereby causing the ions in those plasmas to move away from each other. The resulting Doppler shift is sufficient to permit the pump emission to be absorbed by the lasant ion.

Figure 4:
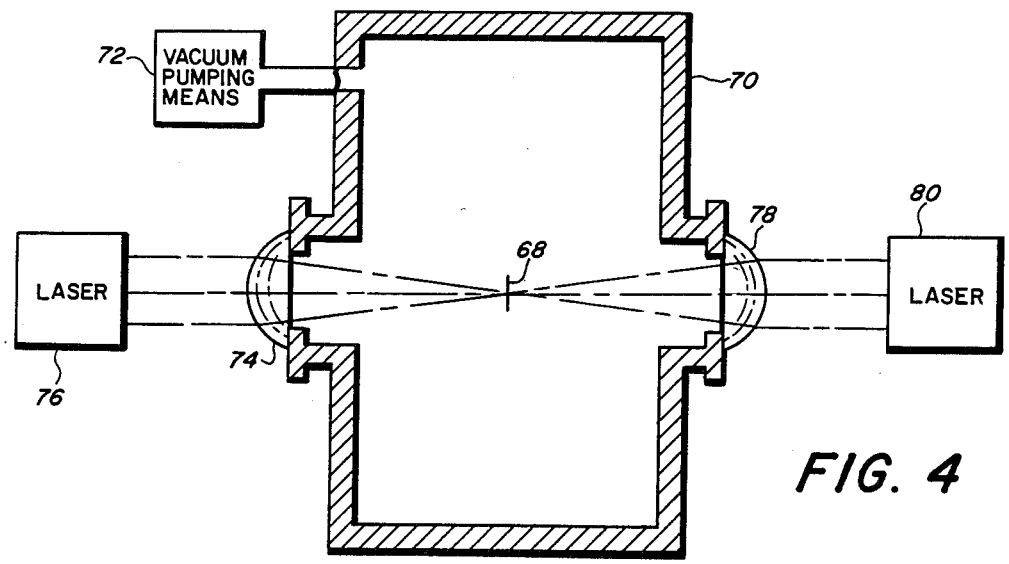
FIG. 4 is a schematic diagram of an apparatus which may be utilized to pump lithium-like magnesium ions with lithium-like silicon ions.

FIG. 4 shows one embodiment of an apparatus which may be utilized to hit a thin foil from opposite directions with two different laser beams. In this configuration, a thin foil 68 is disposed in a vacuum chamber 70. The vacuum chamber 70 includes a vacuum pumping means 72 for providing the proper vacuum pressure. For the silicon ion-magnesium ion lasing system, the pressure may be $10^{-3}$ Torr. A first focusing lens 74 is utilized to focus a beam from a laser 76 through an opening in the vacuum chamber 70 on to one side of a thin foil target 68. A second focusing lens 78 is utilized to focus a beam from a second laser 80 through a second opening in the vacuum chamber 70 to impinge on the thin foil 68 from the opposite direction from the first laser 76. Note again that the lasers 76 and 80 may be realized by a 10000 Angstrom Nd-glass driving laser operated at 20 J, 10 ns, and focused to a 0.5 mm diameter spot. The approximate amount of power required by the laser on the spot is $10^{13}$ Watts/cm$^2$. The temperature in the vacuum chamber 70 may be room temperature.

It should be noted that both of the lasing systems disclosed in the present invention permit significantly lower plasma temperatures than the prior art. Therefore, these systems can be made to operate at the point focus of a modest laboratory laser or over an extended length for maximum gain with increased but still moderate pump power.

It should also be noted that the embodiments of the present invention utilize lithium-like and neon-like ions which are plentiful in a pulsed plasma. Also, the 3d→2p pumping transition for the pump ions are known to produce some of the most intense spectral lines available in pulsed laser plasmas. The embodiment utilizing the neon-like sulfur ion pumping the lithium-like neon ion has a wavelength decrement within the width of the spectral lines involved. The embodiment utilizing the lithium like silicon ions pumping the lithium-like magnesium ions features metallic materials readily available in solid form for convenient target configuration.

The lasing systems of the present invention avoid the use of photoionization schemes and the need for pumping intermediate metastable states. More specifically, the present invention involves the photoexcitation to a specific lasing energy level by a matching emission line, i.e, a tuned photon source. The present process is a one-step process since direct resonant pumping of a particular laser level is utilized.

It should be noted that the present lasing systems are cw in operation and the population inversions generated by the pumping ions for these systems persist for many passes through a resonant cavity. This feature is in contradistinction to many prior art X-ray systems which self-terminate rapidly on a ground state. It should also be noted that many prior art lasing systems deplete the population inversions in their metastable and upper laser states due to ionization caused by their lasing photons. This depletion creates excess ionized ground states so that any lasing quickly quenches itself. However, the present lasing system obtains an x-ray output photon energy which is lower than the photoionization threshold for the levels involved, thereby obviating this problem.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An amplified spontaneous emission x-ray laser comprising:
    means for generating a plasma of neon-like sulfur ions $S^{6+}$ which radiate on a 3d-2p transition; and
    means for generating a plasma of lithium-like neon ions $Ne^{7+}$ which absorb on a 2s-5p absorption transition, said neon ion plasma being generated in close proximity to said sulfur ion plasma in order to obtain pumping radiation from said sulfur ion plasma, wherein said neon-like sulfur ion 3d-2p transition is resonant with said lithium-like neon ion 2s-5p absorption transition to create a population inversion in said plasma of neon ions to provide quasi-cw lasing of said neon ion plasma at x-ray wavelengths between 1A and 700A by amplified spontaneous emission.

2. An x-ray laser as defined in claim 1, wherein said generating means comprise a solid sulfur target with neon frozen on a first surface thereof; and
    and a laser disposed to focus a laser beam on a portion of the first surface of said solid sulfur target.

3. An x-ray laser as defined in claim 1, wherein said generating means comprise a solid sulfur target with neon disposed over a first surface thereof in the form of a gas; and
    a laser disposed to focus a laser beam on a portion of the first surface of said solid sulfur target.

4. An x-ray laser as defined in claim 1, wherein said ion plasma generating means comprises:
    a solid sulfur target with a first and a second adjacent small area, said second small area having a layer of neon disposed on the surface thereof;
    a first laser;
    a second laser; and
    means for focusing light emitted from said first laser onto said first small area on said solid sulfur target, and for focusing light from said second laser onto said second small area on said sulfur target adjacent to said first small area.

5. A method for generating x-ray radiation comprising the steps of:
    generating a plasma of neon-like sulfur ions $S^{6+}$ which radiate on a 3d-2p transition; and
    generating a plasma of lithium-like neon ions $Nw^{7+}$ which absorb on a 2s-5p absorption transition, said neon ion plasma being generated in very close proximity to said sulfur ion plasma in order to obtain pumping radiation therefrom, wherein said neon-like sulfur ion 3d-2p transition is resonant with said lithium-like neon ion 2s-5p absorption transition to create a population inversion in said plasma of neon ions to provide quasi-cw lasing amplification at x-ray wavelengths between 1A and 700A from said $Ne^{7+}$ ions by amplified spontaneous emission.

6. A method as defined in claim 5, wherein said plasma generating steps comprise the step of directing a laser to focus onto a portion of solid sulfur with neon frozen on the surface of the sulfur.

7. A method as defined in claim 5, wherein said plasma generating steps comprise the step of directing a laser to focus onto a portion of solid sulfur with neon disposed thereover in the form of a gas.

8. A method for generating x-ray radiation comprising the steps of:
    generating with spectral broadening a plasma of lithium-like silicon ions $Si^{11+}$ which radiate on the 3d-2p transition; and
    generating with spectral broadening a plasma of lithium-like magnesium ions $Mg^{9+}$ which absorb on a 2s-4p transition, said magnesium ion plasma being generated in very close proximity to said silicon ion plasma in order to obtain pumping radiation therefrom, wherein said lithium-like silicon ion 3d-2p transition resonant with said lithium-like magnesium ion 2s-4p transition to create a population inversion in said plasma of magnesium ions to provide quasi-cw lasing at x-ray wavelengths between 1A and 700A from said $Mg^{9+}$ ions by amplified spontaneous emission.

9. A method as defined in claim 8, wherein said plasma generating steps comprise the step of directing two laser beams to focus on opposite surfaces of a thin foil target of magnesium with silicon sputtered thereon.

10. An x-ray laser comprising:
    means for generating a spectrally broadened plasma of lithium-like silicon ions $Si^{11+}$ which radiate on the 3d-2p transition; and
    means for generating a spectrally broadened plasma of lithium-like magnesium ions $Mg^{9+}$ which absorb on the 2s-4p transition, said magnesium ion plasma being generated in very close proximity to said silicon ion plasma in order to obtain pumping radiation therefrom, wherein said lithium-like silicon ions on the 3d-2p transition are resonant with said lithium-like magnesium ions on the 2s-4p transition to create a population inversion in said plasma of magnesium ions to provide quasi-cw lasing at x-ray wavelengths between 1A and 700A from said $Mg^{9+}$ ions by amplified spontaneous emission.

11. An x-ray laser as defined in claim 10, wherein said generating means comprise
    a thin foil target of magnesium with silicon sputtered thereon; and
    apparatus for directing laser beams to focus on a point in said thin foil target from opposite directions in order to obtain plasma on each side of the target with a desired ion streaming.

* * * * *